United States Patent [19]
Brown

[11] 3,848,563
[45] Nov. 19, 1974

[54] KETTLES
[75] Inventor: John Robert Brown, London, England
[73] Assignee: Sunbeam Electric Limited, Glasgow, Scotland
[22] Filed: June 11, 1973
[21] Appl. No.: 368,674

[30] Foreign Application Priority Data
June 15, 1972 Great Britain...................... 2815/72

[52] U.S. Cl.................. 116/118 R, 73/322, 99/342, 126/388
[51] Int. Cl. ............................................ G01f 23/00
[58] Field of Search ............ 73/307, 309, 319, 322; 99/342; 116/118 R; 126/380, 388

[56] References Cited
UNITED STATES PATENTS
| | | | |
|---|---|---|---|
| 221,542 | 11/1879 | Farrar | 73/322 X |
| 1,246,161 | 11/1917 | Robinson | 126/380 |
| 1,630,611 | 5/1927 | Falk | 73/322 |
| 1,778,840 | 10/1930 | Wale | 73/322 |
| 3,125,946 | 3/1964 | Falla | 126/388 X |

FOREIGN PATENTS OR APPLICATIONS
25,832   0/1896   Great Britain...................... 126/388

Primary Examiner—Louis J. Capozi
Attorney, Agent, or Firm—Bacon & Thomas

[57] ABSTRACT

A kettle having a float and an indicator connected directly to the float and visible to the user of the kettle to move up and down with the float and indicate to the user the amount of water in the kettle.

6 Claims, 3 Drawing Figures

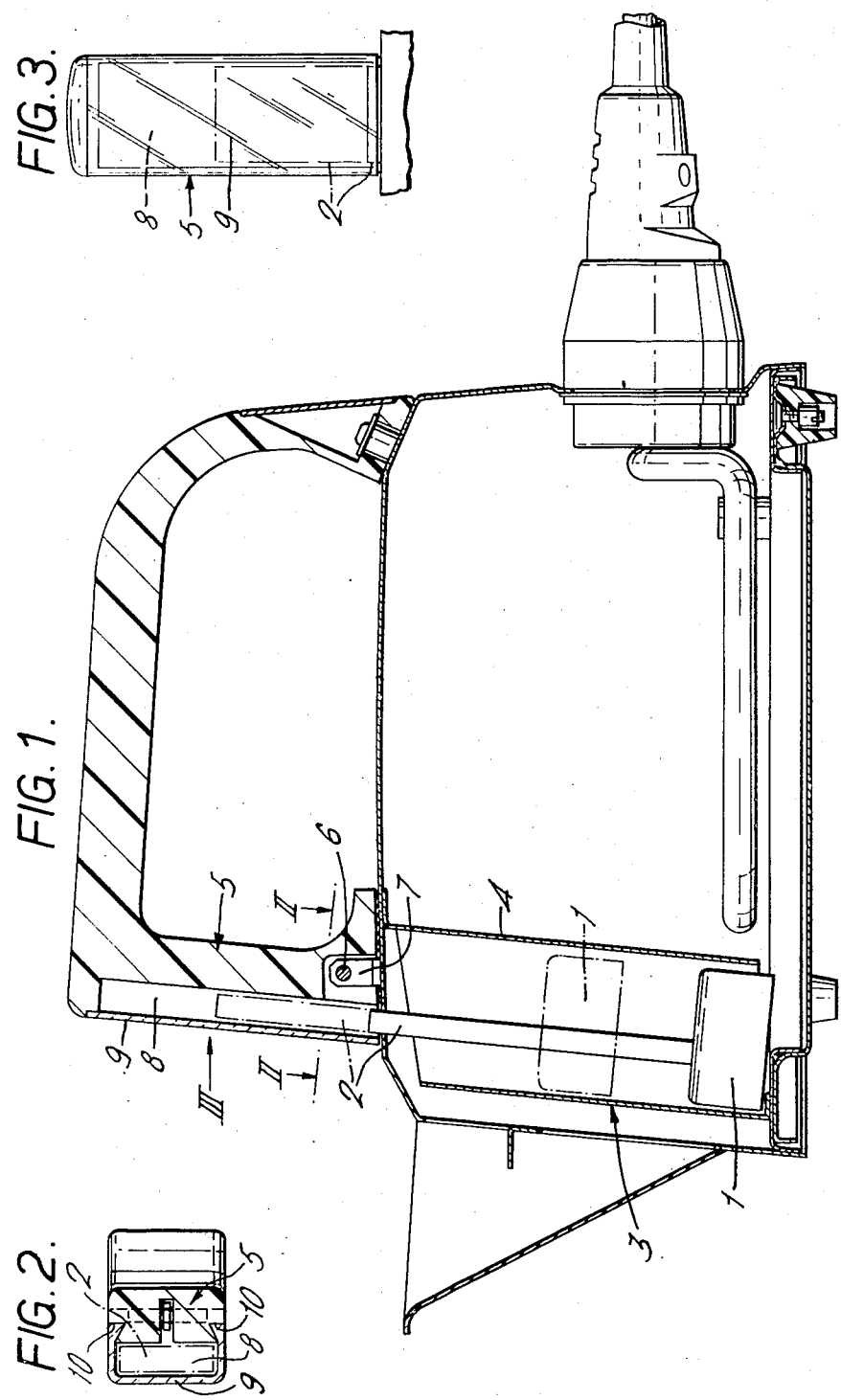

KETTLES

This invention relates to kettles.

According to the invention there is provided a kettle having a float arranged to be in contact with the surface of water in the kettle in use, and indicating means directly associated with the said float and movable up and down with the latter when the water level in the kettle changes, said indicating means being visible to a user of the kettle to indicate the amount of water therein.

Thus a kettle according to the invention incorporates means providing a visual indication to a user of the amount of water in the kettle, without the user having to inspect the water level directly. Such a provision is particularly useful in a kettle of the kind which is not provided with a removable lid but is filled through its spout; up to now a user has had to estimate the amount of water in such a kettle by lifting it to feel its weight, or by pouring some water out to see how far the kettle has to be tipped in order to do so. Advantages also accrue from the application of the invention to a kettle having a removable lid as a user no longer has to remove the lid to inspect the water level, which entailed some risk of the user's hand being burned by a hot lid or by steam.

The said indicating means associated with the float may take any of a number of alternative forms. Thus it may either form part of the float or be directly carried by the latter, for up and down movement in concert with the movement of the float. In one embodiment the float could be constrained to move up and down adjacent a vertically-extending window in a side wall of the kettle so as itself to constitute indicating means visible to a user. Alternatively, and as in a particularly preferred embodiment, the float may carry an upstanding indicating member which is constrained to move up and down (in concert with the float) adjacent a vertically extending window formed in a part upstanding from the top of the kettle, which upstanding part may most conveniently be part of the kettle handle. In such an arrangement the float itself is preferably constrained to move in a predetermined vertical path within the kettle, for example by being enclosed in a vertically-extending housing, or by running between two vertically extending guides (e.g., metal rods or strips) engaging in grooves in opposite sides of the float, or by running on one or more vertical guides extending through an aperture or apertures in the float. Such a guide or guides may be suspended from the kettle roof and when two such guides are provided they may be interconnected at their bottom ends above the kettle floor to maintain their desired lateral spacing.

Graduations may if desired be provided for indicating the amount of water in the kettle with some precision. When the invention is applied to an electric kettle it is particularly desirable that indicia should be provided to show the recommended minimum level of water (below which overheating of the element may occur when the kettle is switched on) and the recommended maximum level (above which spillage may occur when the kettle boils); graduations may be provided between these indicia, if desired. When the invention is applied to an ordinary, non-electric, kettle however it is not necessary for any graduations to be provided at all, so long as a user can, by visual inspection of the indicating means, see what position the latter occupies between its "full" and "empty" extreme positions.

The said float may, as is presently preferred, be arranged to float freely in the surface of water in the kettle. Alternatively, for example, it could be mounted on an arm for up and down pivotal movement about a horizontal axis in the manner of the float of a ball-cock.

An embodiment of the invention will now be described by way of example and with reference to the accompanying drawings, in which:

FIG. 1 is a vertical medial cross-sectional view of an electric kettle according to the invention;

FIG. 2 is a horizontal cross-section of the line II—II of FIG. 1; and

FIG. 3 is a view of the handle of the kettle as indicated at III in FIG. 1.

The electric kettle shown in the drawings incorporates a float 1 in the form of a water-tight capsule carrying an indicating member in the form of an upstanding post 2. The float is constrained to move vertically, with changes in the water level in the kettle, in a vertically extending housing 3 within the kettle. The walls of the housing 3 are of thin sheet metal and the rear wall 4 incorporates two bendable tabs which may be opened and closed to enable the float to be inserted in the housing during assembly.

The handle of the kettle includes a front upright 5 whose bottom end is secured to the roof of the kettle body by a spring pin 6 passing through an upstanding lug 7. A vertical passage 8 is formed in the front of the upright 5 within a transparent plastics U-section window member 9 whose edges are secured in suitable grooves 10 (FIG. 2) in the body of the upright, and the post 2 on the float is constrained to move up and down in the passage 8 in concert with up and down movement of the float upon changes in the water level. The top end of the post 2 is always visible to a user, even when the kettle is empty as shown, and suitable markings (not visible in the drawings) are provided on the window 9 to indicate the recommended minimum and maximum water levels in the kettle. The post 2 is of rectangular section and passes through a rectangular hole in the roof of the kettle, which hole is of minimal size compatible with free up and down movement of the post, so as to minimise the escape of steam when the water boils.

It will thus be seen that the invention provides a kettle incorporating simple, robust and inexpensive means for clearly indicating to a user the amount of water which the kettle contains.

What is claimed is:

1. A kettle with a liquid level indicator comprising a hollow kettle body for containing a liquid, a handle secured to said kettle body, a substantially vertically extending hollow guide housing secured within said kettle body having the interior of said housing in fluid communication with the liquid in said kettle body, float means having an indicating portion, means constraining said float means to vertical movement within said guide housing, to be positioned vertically in accordance with the level of liquid contained within said kettle body, said handle having a substantially vertical upright portion, said upright portion being positioned above said guide housing, a substantially vertically extending passage in said upright portion, an aperture in said kettle body permitting movement of said indicating portion into said passage, said indicating portion being visible in said passage for indicating the level of liquid in said kettle body.

2. A kettle with a liquid level indicator as defined in claim 1 wherein a portion of said passage comprises a transparent window member.

3. A kettle with a liquid level indicator as defined in claim 2 wherein said transparent window member is provided with markings which in connection with said indicating portion provide a reading of the amount of liquid in said kettle body.

4. A kettle with a liquid level indicator as defined in claim 1 wherein said guide housing is provided with tab members, said tab members being movable into and out of float retaining position in order to constrain said float means in said guide housing and to permit insertion of said float means into said housing and removal of said float means therefrom.

5. A kettle with a liquid level indicator as defined in claim 2 wherein said float means indicating portion comprises an upstanding post, said post being of such length as to extend through said aperture into said passage, even when said kettle body is empty.

6. A kettle with a liquid level indicator as defined in claim 5 wherein at least a portion of said post is visible through said transparent window member when said kettle body is empty.

* * * * *